US011276065B2

(12) United States Patent
Shahin (10) Patent No.: US 11,276,065 B2
(45) Date of Patent: **\*Mar. 15, 2022**

(54) TRANSACTION LIFECYCLE MONITORING

(71) Applicant: Goldman Sachs & Co. LLC, New York, NY (US)

(72) Inventor: Shahin Mahmoud Shahin, Clifton, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/400,710

(22) Filed: May 1, 2019

(65) Prior Publication Data

US 2020/0349574 A1 Nov. 5, 2020

(51) Int. Cl.
*G06Q 20/38* (2012.01)
*G06Q 20/40* (2012.01)
*G06Q 20/42* (2012.01)

(52) U.S. Cl.
CPC ....... *G06Q 20/4016* (2013.01); *G06Q 20/382* (2013.01); *G06Q 20/42* (2013.01)

(58) Field of Classification Search
CPC ....... G06Q 20/38; G06Q 40/04; G06F 9/4488
See application file for complete search history.

(56) References Cited

U.S. PATENT DOCUMENTS

| 10,033,611 | B1 | 7/2018 | Linkous et al. | |
| 10,127,270 | B1* | 11/2018 | Evenson | G06F 16/2379 |
| 2007/0069006 | A1* | 3/2007 | Holmes | G07F 7/084 |
| | | | | 235/379 |
| 2009/0249021 | A1* | 10/2009 | Morris | G06F 8/316 |
| | | | | 711/202 |
| 2010/0100462 | A1 | 4/2010 | Lyda et al. | |
| 2012/0330805 | A1 | 12/2012 | Eberle et al. | |
| 2014/0095379 | A1 | 4/2014 | Williams et al. | |
| 2014/0114843 | A1 | 4/2014 | Klein et al. | |
| 2014/0195396 | A1* | 7/2014 | Bhakta | G06Q 40/02 |
| | | | | 705/35 |
| 2014/0282430 | A1* | 9/2014 | Kew | G06F 11/3636 |
| | | | | 717/130 |

(Continued)

FOREIGN PATENT DOCUMENTS

| CN | 107230116 A | 10/2017 |
| JP | 2011-096182 A | 5/2011 |

OTHER PUBLICATIONS

Wikipedia. "Aspect-oriented Programming", Oct. 2016 (Year: 2016).*

(Continued)

*Primary Examiner* — Abdulmajeed Aziz
(74) *Attorney, Agent, or Firm* — Fenwick & West LLP (57) ABSTRACT

An orchestration platform processes transaction requests. The processing includes a series of processing steps. Advices are applied to extract status information before and after execution of at least some of the processing steps. The extracted status information is provided to a transaction monitoring system that provides a user interface for monitoring transaction status. When exceptions occur in transaction processing, the user interface may enable additional information to be provided that addresses the transaction to enable transaction processing to resume.

20 Claims, 5 Drawing Sheets

(56) References Cited

U.S. PATENT DOCUMENTS

| | | | |
|---|---|---|---|
| 2017/0126627 A1* | 5/2017 | Yang | H04L 67/2842 |
| 2017/0279893 A1* | 9/2017 | Saint-Hilaire | G08B 5/36 |
| 2018/0197168 A1 | 7/2018 | Belemlih et al. | |
| 2018/0356964 A1* | 12/2018 | Morris | G06F 3/167 |
| 2019/0014177 A1 | 1/2019 | Katyal et al. | |
| 2019/0141006 A1* | 5/2019 | Schnitt | G06Q 20/405 |
| 2020/0349654 A1 | 11/2020 | Shahin et al. | |

OTHER PUBLICATIONS

Sengupta, "Tracking Transaction Footprints for Non-intrusive End-to-End Monitoring", 2008 International Conference on Autonomic Computing, 2008. (Year: 2008).*
PCT International Search Report and Written Opinion, PCT Application No. PCT/IB2020/053682, dated Jul. 23, 2020, 15 pages.
PCT International Search Report and Written Opinion, PCT Application No. PCT/IB2020/062527, dated Apr. 8, 2021, 11 pages.

* cited by examiner

TRANSACTION LIFECYCLE MONITORING

BACKGROUND

1. Technical Field

The subject matter described generally relates to transaction monitoring, and in particular to applying aspect-oriented programming to monitor the lifecycles of payment transactions.

2. Background Information

Processing and executing corporate, institutional, governmental, and consumer payments is a highly complex process involving numerous processes, components, and systems. In simple terms, a payment transaction is the transfer of money (cash) from one party to another party (known as payor and payee or debtor and creditor). Today, electronic payment systems process large volumes of payment transactions daily. In such an electronic payment transaction, a payor instructs a financial institution to transfer money electronically from an account the payor has with the financial institution to an account of the payee. The payee's account may be with the same financial institution as the payor's account or a different financial institution.

Existing electronic payment systems receive a payment request and determine whether the payment should be approved or denied. If a payment is denied, it may be several hours before the payor is notified and the reason for denial may not be immediately apparent, requiring further analysis to determine the root cause or causes. Furthermore, the payor and payee have little information about the status of the payment until it is either approved or denied.

SUMMARY

Additional insight into transaction processing can be provided using aspect-oriented programming techniques to extract more granular status information regarding transaction status that is available using conventional approaches. Generally, an orchestration platform processes transactions through a series of transaction processing steps. Advices may be applied to the transaction processing code at pointcuts before or after processing steps. The advices extract transaction status information that is provided to a transaction monitoring system. The transaction monitoring system provides a user interface that enables users to monitor the status of transactions as they proceed through the various processing steps.

In various embodiments, if exceptions or other potential issues arise during the processing of a transaction, a relevant user (e.g., the payor, payee, or an agent of the entity that provides the orchestration platform) may be notified before the transaction fails completely. If the exception can be addressed by providing additional information or taking other appropriate action, transaction processing may resume. For example, if an exception occurs because a transaction request is incorrectly formatted, the payor may correct the formatting and have transaction processing resume, rather than the whole transaction fail, requiring the payor to submit a new transaction request. In some embodiments, the transaction monitoring system may aggregate extracted status information and provide reports or other summaries indicating trends or providing other historical analysis.

DETAILED DESCRIPTION

The figures and the following description describe certain embodiments by way of illustration only. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described for monitoring the lifecycles of financial transactions. However, one of skill in the art will recognize that similar approaches may be used to process other types of transaction. One skilled in the art will also recognize that alternative embodiments of the structures and methods may be employed without departing from the principles described. Reference will now be made to several embodiments, examples of which are illustrated in the accompanying figures.

Example Computing Environment

Figure 1:
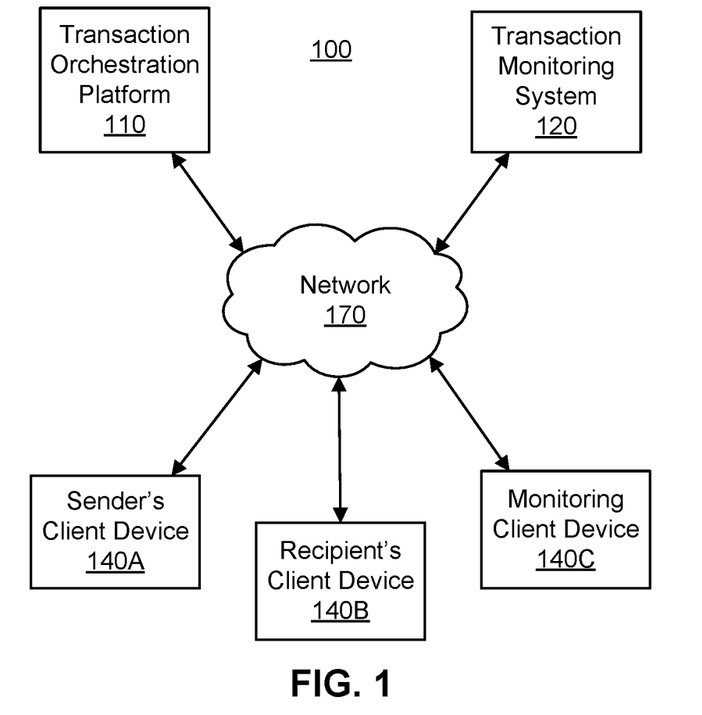
FIG. 1 is a block diagram of a networked computing environment suitable for providing transaction lifecycle monitoring, according to one embodiment.

FIG. 1 illustrates one embodiment of a networked computing environment 100 suitable for providing transaction lifecycle monitoring. In the embodiment shown in FIG. 1, the networked computing environment 100 includes a transaction orchestration platform 110, a transaction monitoring system 120, a sender's client device 140A, a recipient's client device 140B, and a monitoring client device 140C, all connected via a network 170. In other embodiments, the networked computing environment 100 contains different or additional elements. In addition, the functions may be distributed among the elements in a different manner than described. For example, although the transaction orchestration platform 110 and the transaction monitoring system 120 are shown as separate entities, in some embodiments, the corresponding functionality may be provided by a single server or group of servers.

The transaction orchestration platform 110 facilitates transactions between entities. The transaction orchestration platform 110 receives transaction requests (e.g., from senders' client devices 140A) through one or more channels. The transaction orchestration platform 110 performs a set of processing steps to approve or reject transactions. If exceptions are identified during processing of a transaction, the transaction orchestration platform 110 may route the transaction to an exception queue for further processing. Assuming the transaction is ultimately approved, the transaction orchestration platform 110 may provide details of the transaction to a payment facilitator to execute the transaction.

In various embodiments, pointcuts are used to apply advices before or after some or all of the processing steps. The advices extract transaction status information and provide it to the transaction monitoring system 120. The advices may be applied without altering the code that implements the set of transaction processing steps. Thus, the advices may be added to existing transaction processing systems, even where the operator cannot alter the transaction processing code (e.g., due to regulatory or contractual requirements). Embodiments of the transaction orchestration platform 110 are described in greater detail below, with reference to FIGS. 2-4.

The transaction monitoring system 120 receives transaction status information from the transaction orchestration platform 110 (e.g., the status information extracted by the advices). In various embodiments, the transaction monitoring system 120 includes one or more interfaces to provide users with insights into transaction processing. For example, the interfaces may include a graphical user interface (GUI) and an application programming interface (API) that enable users to monitor transaction progress, generate alerts, and take corrective action. The interface may also include one or more reporting tools for identifying trends and performing other historical analysis. Various embodiments of the transaction monitoring system 120 are described in greater detail below, with reference with FIG. 5.

The client devices 140 are computing devices capable of communicating with the transaction orchestration platform 110 or transaction monitoring system 120 via the network 170. For example, a client device 140 may be a desktop computer, a laptop computer, a smartphone, a tablet, a set top box, personal digital assistant, or the like. A sender's client device 140A is configured to submit a transaction request to the transaction orchestration platform 110, a recipient's client device 140B is configured to receive notification of incoming transactions, and a monitoring client device 140C is configured to interface with the transaction monitoring system 120 to present transaction status information to a user. Although FIG. 1 only shows one of each type of client device 140, in practice, the networked computing environment 100 may include many (e.g., thousands or millions of) such devices. Furthermore, a given client device 140 may provide the functionality of two or more types. For example, a user may use a single client device 140 to submit a transaction to the transaction orchestration platform 110 and then interface with the transaction monitoring system 120 to monitor the progress of the transaction (and take further action as appropriate).

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). All or some of the communication links of the network 170 may be encrypted using any suitable technique or techniques.

Example Transaction Orchestration Platform

Figure 2:
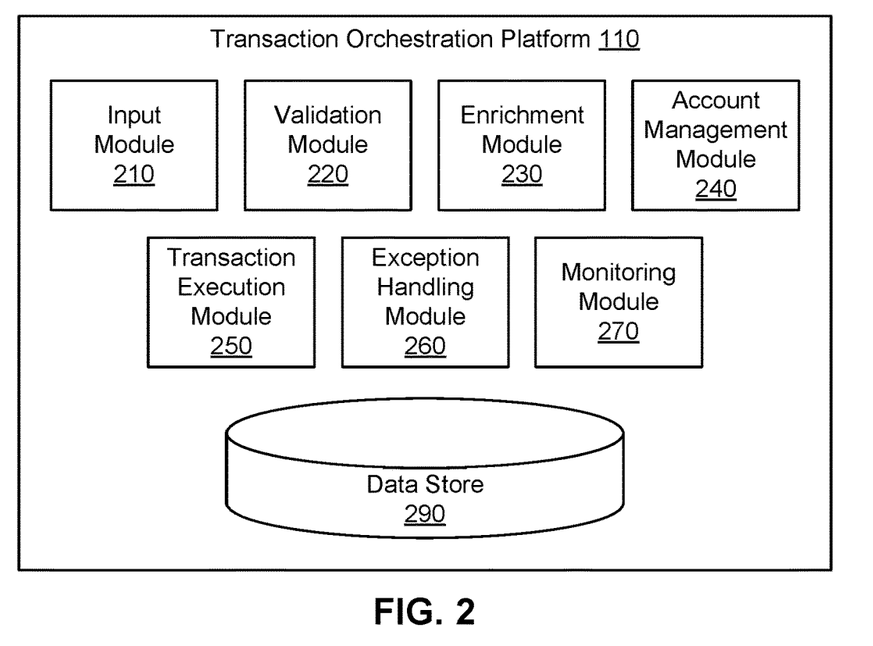
FIG. 2 is a block diagram of the transaction orchestration platform of FIG. 1, according to one embodiment.

FIG. 2 illustrates one embodiment of the transaction orchestration platform 110. In the embodiment shown in FIG. 2, the transaction orchestration platform 110 includes an input module 210, a validation module 220, an enrichment module 230, an account management module 240, a transaction execution module 250, an exception handling module 260, a monitoring module 270, and a data store 290. In other embodiments, the transaction orchestration platform 110 contains different or additional elements. In addition, the functions may be distributed among the elements in a different manner than described.

The input module 210 receives transaction requests from one or more sources. A transaction request includes information regarding a desired transaction, such as a payee identifier (e.g., a payee ID number), a payor ID (e.g., a payor ID number), a value to transfer, a currency (or other form) in which the value should be transferred, etc. In one embodiment, transaction requests may be generated by a payment GUI (e.g., a form on a website), a mobile interface (e.g., an app executing on a smartphone), or an API (e.g., used by a third-party application). In other embodiments, different or additional mechanisms may be used to generate transaction requests.

The validation module 220 performs validation checks on transaction requests. In one embodiment, on receiving a transaction request (e.g., from the input module 210), the validation module 220 retrieves relevant information from one or more datastores (e.g., datastore 290). The relevant information for a given transaction request may include: payor and payee names, payor and payee addresses, default financial accounts for the payor and payee, preferred currency for the payor and payee, specific validation checks required by the payor and payee (if any), or any other information about the transaction.

The validation module 220 performs specific validation checks required by the payor, payee, the financial institution of the payor, the financial institution of the payee, governmental and regulatory bodies, and any other pertinent entities. The validation module 220 may also validate the format of the transaction request. For example, by confirming that all required fields are completed and include appropriate values (e.g., payments in a given currency may be limited to a specified range of values). If the validation module 220 detects an exception (e.g., if a validation check fails), the transaction request is added to an exception queue for further processing (e.g., as described below with reference to the exception handling module 260). In one embodiment, possible exceptions include: the payor is an invalid party, the payee is an invalid party; the currency used in the request is not acceptable, and the transaction is not correctly formatted. Other embodiments may include different or additional validation exception types.

Transaction requests that are successfully validated are passed to the enrichment module 230. The enrichment module 230 may add additional details to a transaction request such as credit-related information (e.g., a credit limit for the payor). The enrichment module 230 may also perform checks for exceptions based on sanctions or fraud. In one embodiment, the enrichment module 230 retrieves information on sanctioned individuals, corporations, governmental agencies or other entities from a database (e.g., datastore 290). The transaction request is compared with the retrieved information to determine if any sanctions/fraud rules or regulations are violated. If a violation is detected, the enrichment module 230 routes the transaction to the exception queue for further processing.

Transactions that pass the sanctions/fraud checks are passed to the account management module 240. In one embodiment, the account management module 240 accesses account data for the payor and payee (e.g., from datastore 290). The account data may include available cash balances in one or more currencies. The account management module 240 may also perform debits and deposits for each affected account. For example, when a payor requests a payment to a payee, the payor's account may be debited the intended amount and the payee's account may be credited with the intended amount. Note that these debits and credits may be to the payor's and payee's balances within the transaction orchestration platform 110 (e.g., in a ledger) not an implementation of the transaction itself (e.g., by transferring cash from the payor's bank account to the payee's bank account).

Rather, the transaction execution module 250 executes transactions. In one embodiment, the transaction execution module 250 executes a transaction by sending it to a payment facilitator or executor via a gateway. There may be numerous payment facilitators or payment executors. Some networks (e.g., SWIFT) provide instructions only on how a payment should be executed leaving the details of the settlement of the actual payment to the payor's and payee's financial institutions. Other networks (e.g., Fedwire) not only allow institutions to provide instructions on how to execute a payment, but will also settle the payment transaction by performing cash movements between the accounts of the payor and payee. Which payment facilitator or executor is used may be determined based on one or more of: a preference included in the transaction request, preferences in the payor's profile, preferences in the payee's profile, parameters of the transaction (e.g., amount, currency, jurisdiction, etc.), etc. The transaction execution module 250 may also add details of the transaction to a database (e.g., datastore 290) for historical tracking. These details may include the payor's and payee's information (e.g., name, account number, etc.), the amount of cash and the associated currency the payment was transacted with, the date and time the payment took place, etc.

The exception handling module 260 processes transactions that are added to the exception queue by other modules (e.g., the validation module 220 or enrichment module 230). The manner in which an exception is processed may depend on the type of exception. For example, if a transaction that triggers an exception based on sanctions or fraud, the exception handling module 260 might generate a report to appropriate parties, such as a compliance officer, a regulatory body, or the like. In contrast, an exception generated due to a transaction being incorrectly formatted may be processed to determine if the formatting can be automatically or semi-automatically corrected. As another example, an exception may be automatically generated if the amount of a transaction exceeds a pre-defined threshold (e.g., $1 billion). The exception handling module 260 may send a notification to a designated person with authority to approve large transactions and not allow processing of the transaction to proceed until that person provide explicit authorization for the transaction.

The monitoring module 270 aggregates information regarding transaction requests at various stages during processing and provides it to the transaction monitoring system 120. The information may represent the status of a transaction request before and after various processing steps. For example, in one embodiment, the monitoring module 270 aggregates information regarding a transaction request from before and after processing by each of the validation module 220, the enrichment module 230, the account management module 240, and the transaction execution module 250. In other embodiments, the monitoring module 270 may obtain information at different or additional stages of the processing of transaction requests. Various embodiments for extraction and aggregation of information regarding a transaction request are described in greater detail below, with reference to FIGS. 4A and 4B.

Figure 3:
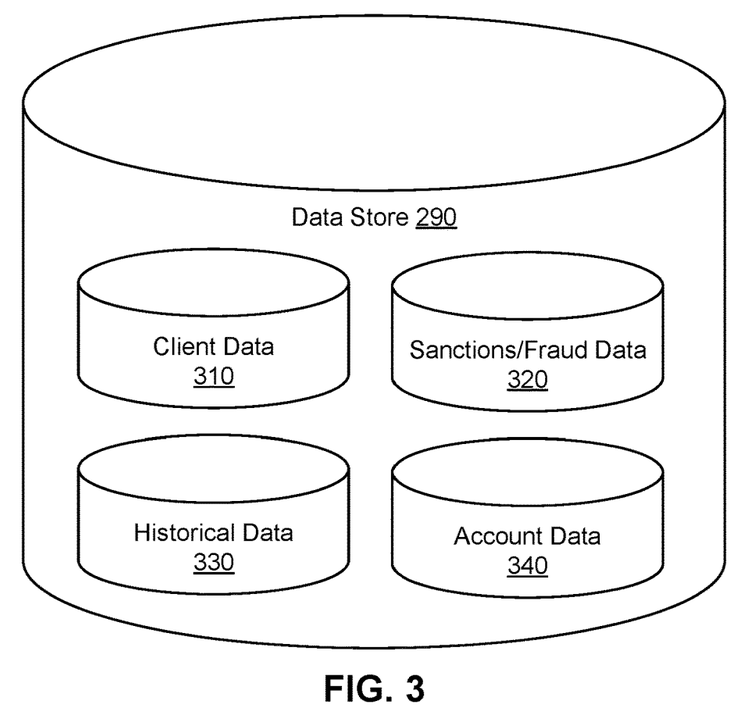
FIG. 3 is a block diagram of the data store of FIG. 2, according to one embodiment.

The data store 290 includes one or more computer-readable media that store data used by the transaction orchestration platform 110. FIG. 3 illustrates one embodiment of the data store 290. In the embodiment shown, the data store 290 stores client data 310, sanctions/fraud data 320, historical data 330, and account data 340. In other embodiments, the data store 290 may store different or additional data. Furthermore, although the data store 290 is shown as a single entity, the stored data may be distributed across multiple devices or storage media. For example, in one embodiment, the data store 290 is a database distributed across multiple servers.

The client data 310 includes information about clients of the transaction orchestration platform 110. In one embodiment, each client has a profile with the transaction orchestration platform 110 that is assigned a unique client ID. The client data 310 includes information about the corresponding client stored in conjunction with each unique client ID. For example, for a given client, the client data 310 may include a name, contact address, other identifying information (e.g., a complete or partial social security number or tax identification number), whether the client is an individual or an entity, currency preferences, etc. The profile may be created by the entity managing the transaction orchestration platform 110. Additionally or alternatively, in some embodiments, clients may be able to create their own profiles (e.g., as part of a registration process).

The sanctions/fraud data 320 includes information on sanctioned individuals, corporations, governmental agencies, or other entities. In one embodiment, the sanctions/fraud data 320 includes identifying information associated with sanctioned entities stored in conjunction with indicators of what sanctions currently apply. For example, an entry might include a name, whether the entity is an individual or other legal entity, an address, and other identifying information (e.g., a complete or partial social security number or tax identification number) along with an indication of the source and type of sanctions applied to that entity. In other embodiments, the sanctions/fraud 320 data may include different or additional information regarding sanctioned entities.

The historical data 330 includes a history of previous transactions. In one embodiment, the historical data 330 includes an identifier of the payor and payee (e.g., unique client IDs); the value transferred and currency used; and the date and time the transaction was received or executed. The historical data 330 may be used to identify trends in use of the transaction orchestration platform 110. In other embodiments, the historical data 330 may include different or additional information about processed transactions.

The account data 340 includes information about clients' accounts. As used herein, "account" refers to an account for storing value (e.g., a bank account) that is controlled or otherwise accessible for a client in contrast to "profile" which is used to refer to a collection of information about a client. In one embodiment, for each client, the account data 340 includes identifiers of one or more accounts in conjunction with information about those accounts (e.g., currency, balance, etc.). The account data 340 may include a ledger that is updated substantially in real time (e.g., within a few seconds) of transactions requests being received to provide a more accurate indication of the amount of cash available than may be provided by the financial institution that provides the account. For example, the financial institution may only report the previous end-of-day balance of the account, whereas the ledger can provide a substantially real-time measure of cash availability in view of other transaction requests involving the same account. In other embodiments, the account data 340 may include different or additional information regarding clients' accounts.

Example Approach for Extracting Transaction Information

Figure 4A:
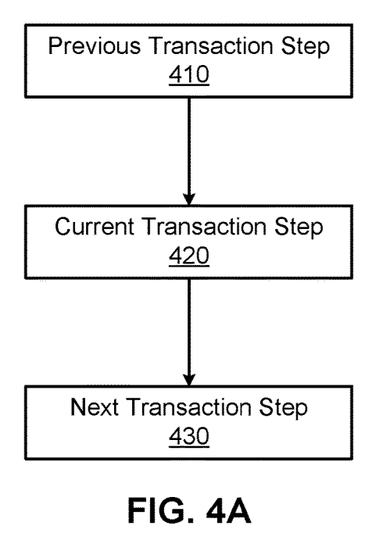
FIGS. 4A and 4B are flowcharts illustrating a method for extracting information from an existing transaction process, according to one embodiment.

FIG. 4A illustrates a portion of existing code for processing a transaction request. In particular, the transaction request is passed from a previous transaction step 410 to a current transaction step 420 and on to a next transaction step 430. For example, the previous transaction step 410 might be the validation tests performed by the validation module 220, the current transaction step 420 might be the sanctions/fraud checks performed by the enrichment module 230, and the next transaction step might be the account credit/debit operations performed by the account management module 240. However, the three transaction steps may be any set of consecutive processes performed in orchestrating a transaction.

Figure 4B:
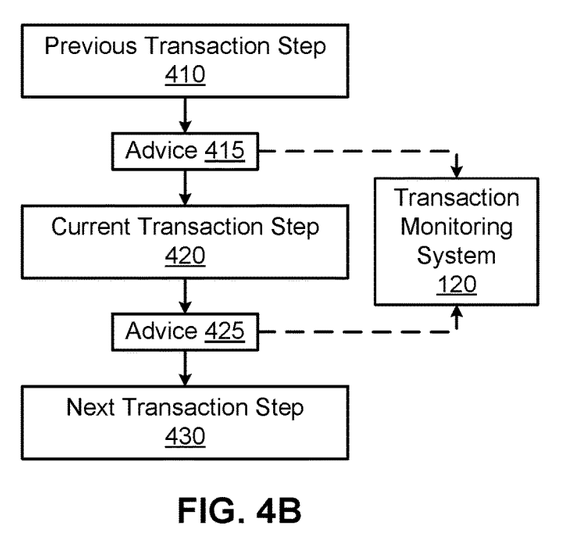

FIG. 4B illustrates the same portion of existing code as FIG. 4A with the addition of a pre-execution advice 415 and a post-execution advice 425. The advices 415, 425 extract information regarding the transaction request being processed and send it to the transaction monitoring system 120. The pre-execution advice 415 is applied at a first pointcut located before the code that implements the substantive elements of the current transaction step 420 and the post-execution advice 425 is applied at a second pointcut located after the code that implements the substantive elements of the current transaction step 420. Thus, the transaction monitoring system 120 may use the extracted information to analyze the impact of the current transaction step 420. Note that either the previous transaction step 410, the next transaction step 430, or both may have corresponding pre- and post-advices as well.

In one embodiment, the pre-execution advice 415 captures the current date and time (before the current transaction step 420 begins), the identity of the payor and payee, and any input variables provided to the current transaction step 420. Similarly, the post-execution advice 425 captures the date and time (after completion of the current transaction step 420), the amount of time taken to execute the current transaction step 420, the outputs from the current transaction step 420, and any exceptions or errors that occurred during processing of the current transaction step 420. In other embodiments, the advices may capture different or additional information regarding the transaction request.

Although FIG. 4B only shows advices on either side of one transaction step, in practice, pairs of advices sandwich more (e.g., all of the) transaction request processing steps. Thus, as a transaction request proceeds through the various processing requests, the advices extract information and provide it to the transaction monitoring system 120. The transaction monitoring system 120 uses the extracted information to generate UIs for providing status updates regarding the transaction request and, in some embodiments, enable users to take corrective action to address errors and exceptions. The transaction processing system 120 may also use the extracted information to generate reports to identify trends and perform other forensic analysis.

Example Transaction Monitoring System

Figure 5:
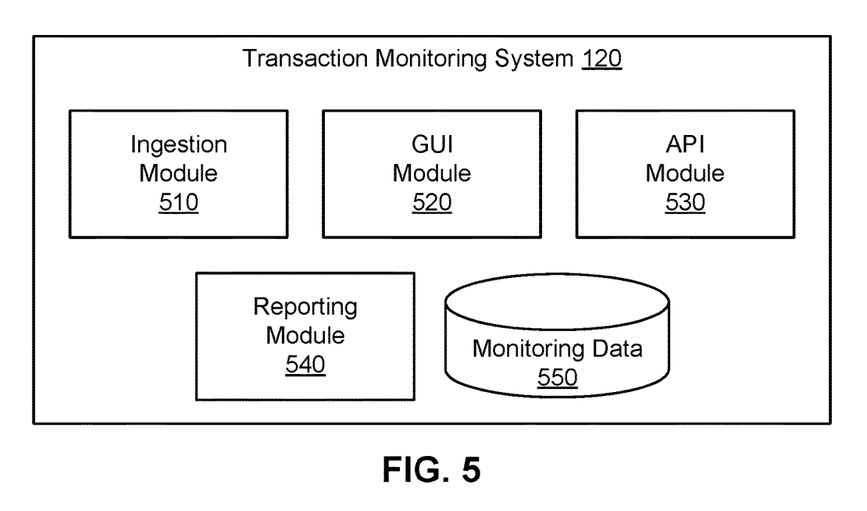
FIG. 5 is a block diagram illustrating the transaction monitoring system of FIG. 1, according to one embodiment.

FIG. 5 illustrates an embodiment of the transaction monitoring system 120. In the embodiment shown, the transaction monitoring 120 system includes an ingestion module 510, a GUI module 520, an API module 530, a reporting module 540, and monitoring data 550. In other embodiments, the transaction monitoring system 120 contains different or additional elements. In addition, the functions may be distributed among the elements in a different manner than described. For example, some embodiments may not include an API module 530 or a reporting module 540.

The ingestion module 510 receives transaction request information extracted by advices of the transaction orchestration platform 110 (e.g., via the network 170). In various embodiments, the ingestion module 510 maintains a data object (e.g., in the monitoring data 550) for each transaction request. When information regarding a transaction request is received from the first advice the ingestion module 510 instantiates a new data object for the transaction request. The fields of instantiated data object are initially empty, meaning they are either void or contain a default value. As additional information is received from each advice, the ingestion module 510 updates the data object. In one such embodiment, the data object for a transaction request includes the following fields:

- Transaction ID: an identifier for the transaction, which is generally unique throughout time. Alternatively, identifiers may be recycled under certain conditions (e.g., after a specified amount of time has passed or after all valid identifiers have been used).
- Payee: an identifier of the payee, such as the payee's name or a unique identifier (e.g., a client ID with the transaction orchestration platform 110).
- Payee Account ID: an identifier of the payee's financial account identifier held at a bank. This account represents the running balance of cash available for the payee.
- Payee Institution ID: an identifier of the payee's institution, which may be either a bank (or other financial institution) or a corporate entity. Generally, each financial institution and corporate entity is assigned a unique identifier.
- Payor: an identifier of the payor, such as the payor's name or a unique identifier (e.g., a client ID with the transaction orchestration platform 110).
- Payor Account ID: an identifier of the payor's financial account identifier held at a bank. This account represents the running balance of cash available for the payor.
- Payor Institution ID: an identifier of the payor's institution, which may be either a bank (or other financial institution) or a corporate entity.
- Transaction Method: an alphanumeric field representing the method of payment that the payor or the transaction orchestration platform 110 intends to use to execute the transaction. For example, the payor may instruct the transaction orchestration platform 110 to send a payment to a payee via the SWIFT network. Alternatively, the transaction orchestration platform 110 may choose a method of payment that will efficiently execute the transaction (e.g., by selecting the method that will: incur the least amount of fees and taxes or result in the fastest transfer of cash from the payor to the payee, etc.).

Transaction Amount: a decimal monetary amount representing the payment the payor wishes to send to the payee.

Origination Currency: an alphanumeric field representing the currency the payor will provide (e.g., U.S. Dollars, Euros, Japanese Yen, etc.).

Destination Currency: an alphanumeric field representing the currency the payee will receive (e.g., U.S. Dollars, Euros, Japanese Yen, etc.).

Transaction Date: a date (or alphanumeric) field representing the date on which the transaction request indicates the transfer of cash should occur.

Date Time Start: a timestamp (e.g., expressed as an alphanumeric field) indicating the date and time at which processing of the transaction request began. This may be generated when the transaction request is received by the transaction orchestration platform 110.

Date Time End: a timestamp (e.g., expressed as an alphanumeric field) indicating the date and time at which processing of the transaction request was completed. This may be generated when the transaction has been successfully executed or when the transaction orchestration platform 110 determined the transaction request cannot be executed.

Fee Amount: a monetary amount of the fee (or sum of fees) associated with executing the transaction.

Fee Currency: an alphanumeric field representing the currency of the fee

Fee Payor ID: an identifier of the entity paying the fee, which may either be the payor, the payee, the payor's or payee's institution, or some other entity responsible for the fee.

Tax Amount: a monetary amount representing the tax (or sum of taxes) associated with executing the transaction.

Tax Currency: an alphanumeric field representing the currency of the tax.

Tax Payor ID: an identifier of the entity paying the tax, which may be either the payor, the payee, the payor's or payee's institution, or some other entity responsible for the tax.

Exceptions: a list (or array) of zero or more exceptions or errors generated by the transaction orchestration platform 110 in processing the transaction request. Examples of exceptions or errors may include: technical errors associated with executing the transaction; an invalid payor or payee; the payor or payee participating in a fraudulent or sanctioned payment transaction; insufficient funds being available in the payor's account; etc.

In other embodiments, the data object may include different or additional fields and some of the fields may include different or additional information. Furthermore, some of the fields may be merged.

The GUI module 520 generates a GUI via which users may view the current status of pending transactions and information regarding the lifecycle of completed transactions. In one embodiment, the GUI is provided as part of a webpage that users access via the network 170 from a client device 140. A user provides identifying information for a transaction (e.g., a transaction ID, payor ID, payee ID, etc.) and the GUI presents status information for the transaction. If the identifying information does not uniquely identify a single transaction (e.g., if the user provides just a payor ID), the GUI may present a list of transactions and prompt the user to select the desired transaction The GUI may also provide tools with which the user can take corrective action if the current status of a transaction indicates a problem (e.g., the transaction orchestration platform 110 encountered an exception or error). For example, if a transaction triggers a sanctions-based exception, the user may provide evidence that the payor or payee is not the sanctioned entity, that the sanctions do not apply to the current transaction, or the like. As another example, if an exception is triggered because the payor has insufficient cash in their account, the user may identify a different account from which cash may be taken or add additional cash to the account and request that the transaction orchestration platform 110 attempts to process the transaction again.

The API module 530 provides an API with which other applications (e.g., third-party applications) may access the transaction request information. For example, a financial institution may develop its own GUI for employees to monitor transactions and take corrective action as appropriate. As another example, an entity may have an automated monitoring system that detects exceptions and triggers corrective action. The corrective action may be automated (e.g., adding additional cash to an account if needed to complete a transaction) or semi-automated (e.g., sending an email or other notification to an individual tasked with handling exceptions of the detected type).

The reporting module 540 generates reports based on the transaction information received from the transaction orchestration platform 110. The reports may be generated on a fixed schedule (e.g., daily, weekly, monthly, etc.), when certain triggering conditions are met (e.g., every ten thousand transactions), or in response to a request from a user (e.g., a request generated via a GUI provided by the GUI module 520). The reports may include the average time each processing step takes, trends in processing times (e.g., whether the time taken to compete each step is increasing or decreasing), and any other pertinent information. Thus, among other things, the reports may assist in identifying system performance issues and predict need for increased (or decreased) system capacity to meet future demand. In some embodiments, the reporting module 540 may also generate different types of reports. For example, a user representing an entity might generate a report indicating the total value of transactions in which the entity was a payor or payee, or a net value of all transactions involving the entity, in different time periods (e.g., per week, per month, per year, etc.). Such a report may help the user identify trends in the entity's transactions.

The monitoring data 550 is stored using one or more computer-readable media. In one embodiment, the monitoring data 550 is stored on a hard drive of the transaction monitoring system 120. Although the monitoring data 550 is shown as a single entity located within the transaction monitoring system 120, in some embodiments, the monitoring data may be distributed across multiple devices or storage media. For example, the monitoring data 550 might be stored in a distributed database and accessed by the transaction monitoring system 120 remotely (e.g., via the network 170).

Example Method

Figure 6:
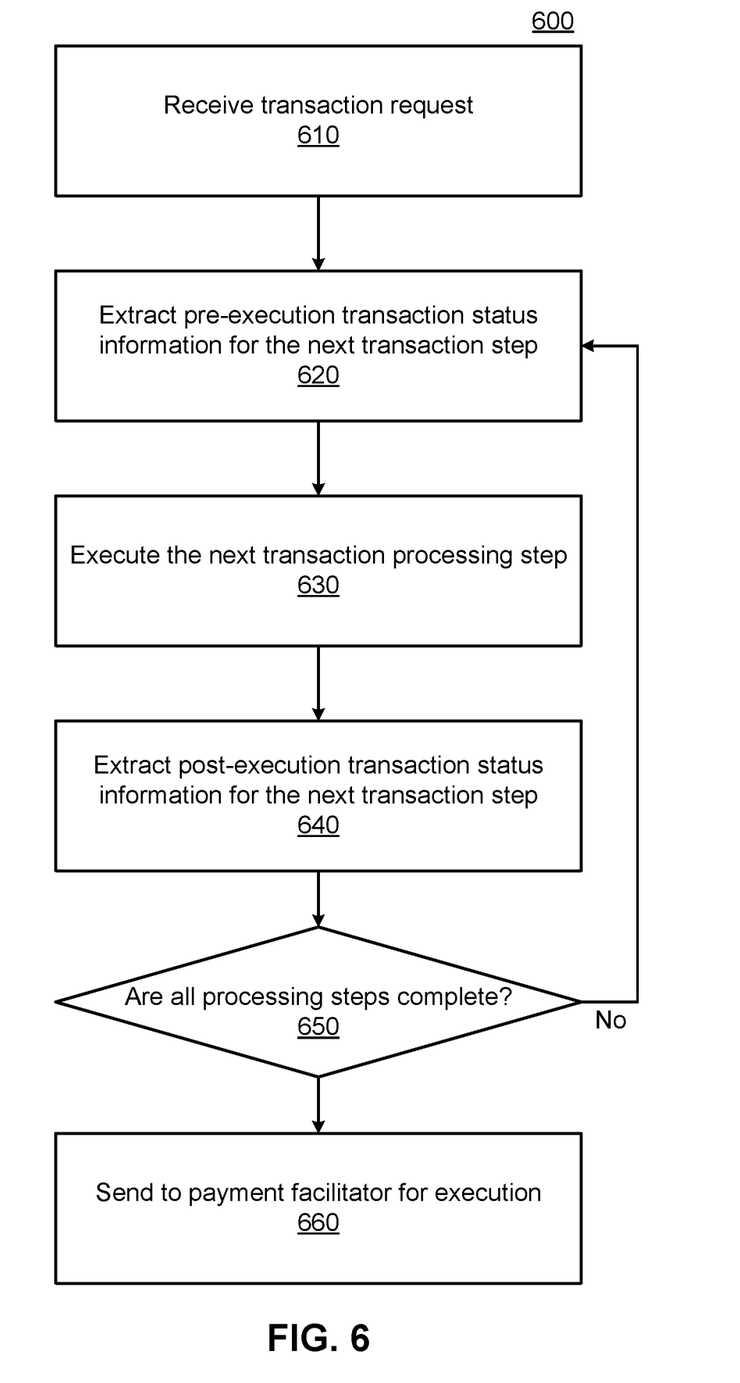
FIG. 6 is a flowchart illustrating a method for transaction lifecycle monitoring, according to one embodiment.

FIG. 6 illustrates a method 600 for processing a transaction request and providing transaction lifecycle monitoring, according to one embodiment. The steps of FIG. 6 are illustrated from the perspective of the transaction orchestration platform 110 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the transaction orchestration platform 110 receiving 610 a transaction request (e.g., from a sender's client device 140A). As described previously, the transaction request may include information about a desired transaction, such as identifiers of the sender and recipient, an amount to transfer, a currency to use, a date for the transaction to execute, or any other pertinent information.

The transaction orchestration platform 110 extracts 620 pre-execution transaction status information, executes 630 the first transaction processing step, and extracts 640 post-execution transaction status information. As described previously, the pre-execution and post-execution transaction status information may be extracted 620, 640 using a pair of advices and sent to the transaction monitoring system 120.

If all of the transaction processing steps are not complete 650, the transaction orchestration platform 110 extracts 620 pre-execution transaction status information for the next transaction processing step, executes 630 the next transaction processing step, and extracts 640 post-execution transaction status information for the next transaction processing step. This process iterates until all of the transaction processing steps are complete 650 and the transaction orchestration platform 110 sends 660 a message to a payment facilitator with instructions to execute the transaction.

The extracted transaction status information may be used by the transaction monitoring system 120 to provide insight into the status of the transaction and its progress through the transaction orchestration process. Because the embodiment shown in FIG. 6 extracts information before and after each processing step, the transaction monitoring system 120 may provide users with a detailed analysis of the processing of the transaction request. For example, users may see how long each step took to complete, helping them identify potential choke points, and may also be notified of problems (e.g., errors or exceptions) and provided opportunities to take corrective action. Thus, the approach described improves the efficiency of the transaction orchestration platform 110.

Trend analysis may enable efficient identification and mitigation of potential future problems before they arise (e.g., if the number of transaction requests is increasing over time, the entity managing the platform may add additional capacity before the platform becomes congested). Furthermore, the use of advices applied at pointcuts to extract transaction status information may enable the described approach to be implemented in existing transaction orchestration platforms 110 without the need to edit the code that implements the transaction request processing steps themselves.

Computing System Architecture

Figure 7:
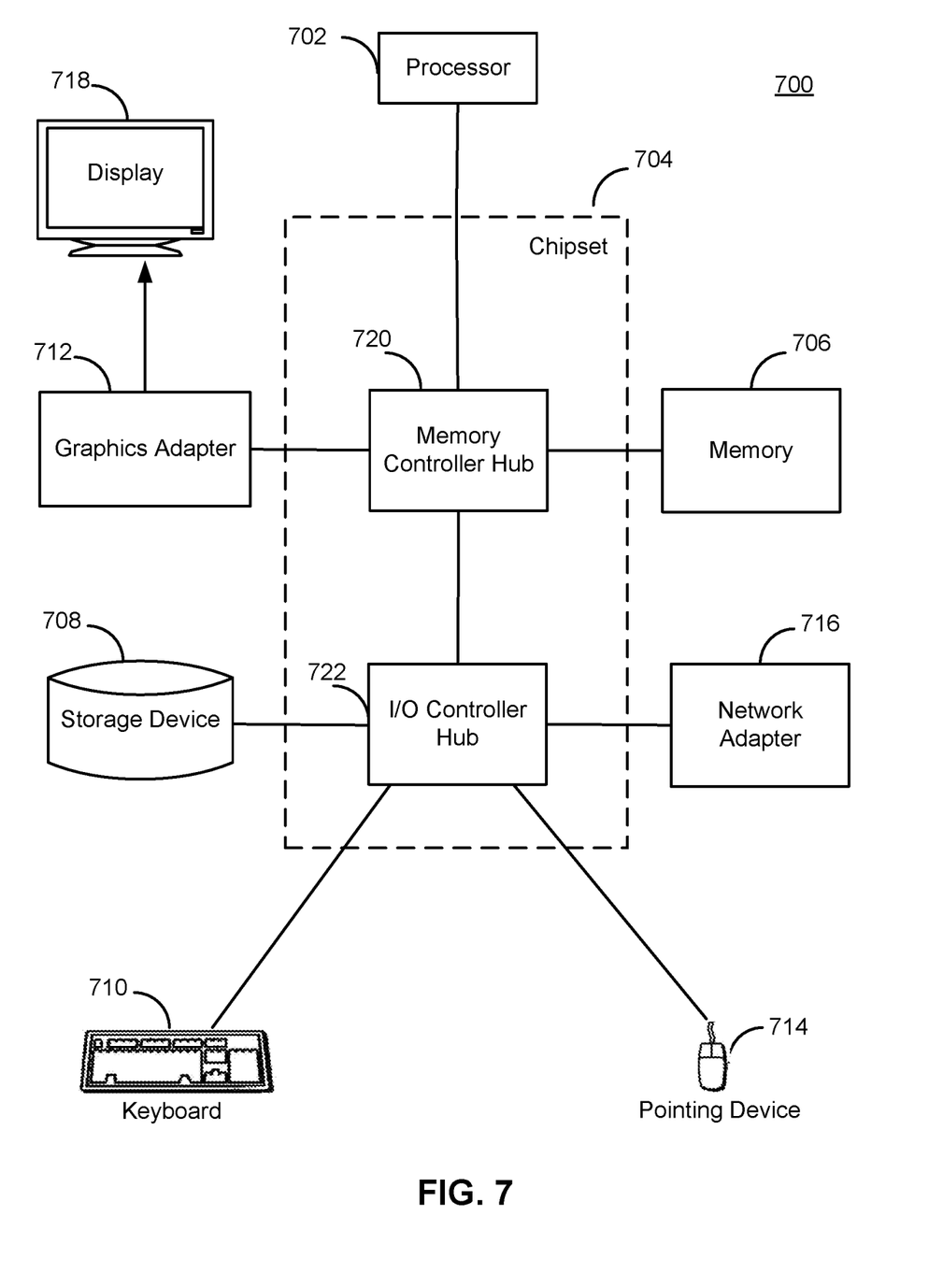
FIG. 7 is a block diagram illustrating an example of a computer suitable for use in the networked computing environment of FIG. 1, according to one embodiment.

FIG. 7 illustrates an example computer 700 suitable for use as a client device 140, a transaction monitoring system 120, or as part of a transaction orchestration platform 110. The example computer 700 includes at least one processor 702 coupled to a chipset 704. For convenience, the processor 702 is referred to as a single entity but it should be understood that the corresponding functionality may be distributed among multiple processors using various ways, including using multi-core processors, assigning certain operations to specialized processors (e.g., graphics processing units), and dividing operations across a distributed computing environment. Any reference to a processor 702 should be construed to include such architectures.

The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 causes images and other information to be presented on the display 718 (which may be part of the computer system or a remote device, such as a projector). The network adapter 716 couples the computer system 700 to one or more computer networks (e.g., network 170).

The types of computers used by the entities of FIGS. 1-3 and 5 can vary depending upon the embodiment and the processing power required by the entity. For example, the transaction orchestration platform 110 might include a distributed database system including multiple servers working together to provide the functionality described. Furthermore, a computer can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Finally, while particular embodiments and applications have been illustrated and described, it is to be understood that these embodiments are illustrative. Various modifications, changes, and variations to the disclosed examples may be apparent to those skilled in the art. Accordingly, the disclosed embodiments should not be considered limiting on the scope of protection. Rather, the scope of protection should be limited only by the following claims.

What is claimed is:

1. A non-transitory computer-readable medium comprising a storage device with computer program code for monitoring a payment transaction lifecycle using aspect-oriented programming, that, when executed by a computing device of a transaction orchestration platform, causes the computing device to perform operations including:
    receiving, at the transaction orchestration platform, a transaction request;
    processing, by the transaction orchestration platform, the transaction request, the processing including a set of transaction processing steps;
    extracting, by the transaction orchestration platform, information during the processing with a plurality of advices, using aspect-oriented programming, to obtain extracted information, the extracted information including information about an exception that prevented completion of processing of the transaction request, wherein, for each of a plurality of transaction processing steps of the set of transaction processing steps, a first advice is applied before a given transaction processing step of the plurality of transaction processing steps and a second advice is applied after the given transaction processing step, the extracted information further including, for each of the plurality of transaction processing steps of the set of transaction processing steps, values of parameters of the given transaction processing step, the parameters including a first timestamp indicating when the given transaction processing step began and a second timestamp indicating when the given transaction processing step completed;
    populating, by the transaction orchestration platform, a data object corresponding to the transaction request based on the extracted information;
    generating, by the transaction orchestration platform, status information indicating a status of the transaction request based on the data object;
    providing, by the transaction orchestration platform, the status information to a client device for display;
    providing, by the transaction orchestration platform and to a transaction monitoring system, the extracted information;
    receiving, by the transaction orchestration platform, additional information regarding mitigating the exception;
    resuming, by the transaction orchestration platform, processing of the transaction request based on the additional information;
    aggregating, by the transaction orchestration platform, the status information with additional status information corresponding to additional transactions to generate aggregated status information;
    generating, by the transaction orchestration platform, a report based on the aggregated status information, the report indicating a trend in the aggregated status information;
    providing, by the transaction orchestration platform, the report to the client device for display; and
    taking corrective action, by the transaction orchestration platform, in view of the trend to mitigate a future problem, wherein the corrective action comprises automatically adding additional transaction processing capacity responsive to the trend indicating a number of transaction requests is increasing over time.

2. The non-transitory computer-readable medium of claim 1, wherein the extracted information includes an amount of time the given transaction processing step took to complete.

3. The non-transitory computer-readable medium of claim 1, wherein the extracted information received from the first advice comprises inputs provided to the given transaction processing step, the inputs including: an identifier of a payee, an identifier of a payor, an amount of value to transfer, and the first time stamp indicating when the given transaction processing step began.

4. The non-transitory computer-readable medium of claim 1, wherein extracted information received from the second advice comprises outputs from the given transaction processing step, the outputs including: an identifier of a payee, an identifier of a payor, an amount of value to transfer, and the second timestamp indicating when the given transaction processing step completed.

5. The non-transitory computer-readable medium of claim 1, wherein the transaction request is for a payment transaction where money is transferred from a payor to a payee.

6. The non-transitory computer-readable medium of claim 1, wherein the operations further include:
    sending, by the transaction orchestration platform, a message to a payment facilitator including instructions to execute the transaction request.

7. The non-transitory computer-readable medium of claim 1, wherein the plurality of advices is applied without modifying code that implements the plurality of transaction processing steps of the set of transaction processing steps.

8. A computer-implemented method for monitoring a payment transaction lifecycle using aspect-oriented programming, the computer-implemented method comprising:
    receiving, at a transaction orchestration platform, a transaction request;
    processing, by the transaction orchestration platform, the transaction request, the processing including a set of transaction processing steps;

extracting, by the transaction orchestration platform, information during the processing with a plurality of advices, using aspect-oriented programming, to obtain extracted information, the extracted information including information about an exception that prevented completion of processing of the transaction request, wherein, for each of a plurality of transaction processing steps of the set of transaction processing steps, a first advice is applied before a given transaction processing step of the plurality of transaction processing steps and a second advice is applied after the given transaction processing step, the extracted information further including, for each of the plurality of transaction processing steps of the set of transaction processing steps, values of parameters of the given transaction processing step, the parameters including a first timestamp indicating when the given transaction processing step began and a second timestamp indicating when the given transaction processing step completed;

populating, by the transaction orchestration platform, a data object corresponding to the transaction request based on the extracted information;

generating, by the transaction orchestration platform, status information indicating a status of the transaction request based on the data object;

providing, by the transaction orchestration platform, the status information to a client device for display;

providing, by the transaction orchestration platform and to a transaction monitoring system, the extracted information;

receiving, by the transaction orchestration platform, additional information regarding mitigating the exception;

resuming, by the transaction orchestration platform, processing of the transaction request based on the additional information aggregating, by the transaction orchestration platform, the status information with additional status information corresponding to additional transactions to generate aggregated status information;

generating, by the transaction orchestration platform, a report based on the aggregated status information, the report indicating a trend in the aggregated status information;

providing, by the transaction orchestration platform, the report to the client device for display; and taking corrective action, by the transaction orchestration platform, in view of the trend to mitigate a future problem, wherein the corrective action comprises automatically adding additional transaction processing capacity responsive to the trend indicating a number of transaction requests is increasing over time.

9. The computer-implemented method of claim 8, wherein the extracted information includes an amount of time the given transaction processing step took to complete.

10. The computer-implemented method of claim 8, wherein the extracted information received from the first advice comprises inputs provided to the given transaction processing step, the inputs including: an identifier of a payee, an identifier of a payor, an amount of value to transfer, and the first timestamp indicating when the given transaction processing step began.

11. The computer-implemented method of claim 8, wherein the extracted information received from the second advice comprises outputs from the given transaction processing step, the outputs including: an identifier of a payee, an identifier of a payor, an amount of value to transfer, and the second timestamp indicating when the given transaction processing step completed.

12. The computer-implemented method of claim 8, wherein the transaction request is for a payment transaction where money is transferred from a payor to a payee.

13. The computer-implemented method of claim 8, wherein the computer-implemented method further comprises:
sending, by the transaction orchestration platform, a message to a payment facilitator including instructions to execute the transaction request.

14. The computer-implemented method of claim 8, wherein the plurality of advices is applied without modifying code that implements the plurality of transaction processing steps of the set of transaction processing steps.

15. A transaction orchestration platform for monitoring a payment transaction lifecycle using aspect-oriented programming, the transaction orchestration platform comprising:
at least one computing device, each of the at least one computing device including at least one processor and a memory containing processor executable modules that include:
an input module configured to:
receive a transaction request;
a transaction request processing module configured to:
sequentially perform a set of transaction processing stepson the transaction request, wherein each advice of a plurality of advices is respectively applied before or after a given transaction processing step of the set of transaction processing steps, each advice configured to extract transaction information, using aspect-oriented programming, to obtain extracted transaction information, the extracted transaction information including information about an exception that prevented completion of processing of the transaction request, wherein, for each of a plurality of transaction processing steps of the set of transaction processing steps of the transaction request, a first advice is applied before the given transaction processing step of the plurality of transaction processing steps and a second advice is applied after the given transaction processing step, the extracted transaction information further including, for each of the plurality of transaction processing steps of the set of transaction processing steps, values of parameters of the given transaction processing step, the parameters including a first timestamp indicating when the given transaction processing step began and a second timestamp indicating when the given transaction processing step completed;
a transaction monitoring module configured to:
provide the extracted transaction information to a transaction monitoring system, wherein the transaction monitoring module populates a data object corresponding to the transaction request based on the extracted transaction information, gene rates status information indicating a status of the transaction request based on the data object, and provides the status information to a client device for display;
an exception handling module configured to:
receive additional information regarding mitigating the exception and cause processing of the transaction request to resume responsive to the additional information;
a reporting module configured to:

aggregate the status information with additional status information corresponding to additional transactions to generate aggregated status information;

generate a report based on the aggregated status information, the report indicating a trend in the aggregated status information; and provide the report to the client device for display; and an application programming interface (API) module that provides an API, the API module configured to:

take corrective action, using the API and in view of the trend, to mitigate a future problem, wherein the corrective action comprises automatically adding additional transaction processing capacity responsive to the trend indicating a number of transaction requests is increasing overtime.

16. The transaction orchestration platform of claim 15, wherein the extracted transaction status information received from the first advice comprises inputs provided to the given transaction processing step, the inputs including: an identifier of a payee, an identifier of a payor, an amount of value to transfer, and the first timestamp indicating when the given transaction processing step began.

17. The transaction orchestration platform of claim 15, further comprising a transaction wherein the extracted transaction status information received from the second advice comprises outputs from the given transaction processing step, the outputs including: an identifier of a payee, an identifier of a payor, an amount of value to transfer, and the second timestamp indicating when the given transaction processing step completed.

18. The transaction orchestration platform of claim 15, wherein the extracted information includes an amount of time the given transaction processing step took to complete.

19. The transaction orchestration platform of claim 15, wherein the processor executable modules further include a transaction execution module configured to send a message to a payment facilitator including instructions to execute the transaction request.

20. The transaction orchestration platform of claim 15, wherein the plurality of advices is applied without modifying code that implements the plurality of transaction processing steps of the set of transaction processing steps.

* * * * *

UNITED STATES PATENT AND TRADEMARK OFFICE
CERTIFICATE OF CORRECTION

PATENT NO. : 11,276,065 B2
APPLICATION NO. : 16/400710
DATED : March 15, 2022
INVENTOR(S) : Shahin Mahmoud Shahin It is certified that error appears in the above-identified patent and that said Letters Patent is hereby corrected as shown below:

In the Claims

In Column 14, in Claim 4, Line 42, after "wherein" insert -- the --.

In Column 15, in Claim 8, Line 37, after "information" insert -- ; --.

In Column 16, in Claim 15, Line 29, delete "stepson" and insert -- steps on --, therefor.

In Column 16, in Claim 15, Line 58, delete "gene rates" and insert -- generates --, therefor.

In Column 17, in Claim 15, Line 15, delete "overtime." and insert -- over time. --, therefor.

Signed and Sealed this
Twenty-seventh Day of December, 2022

Katherine Kelly Vidal
*Director of the United States Patent and Trademark Office*